Figure 1:
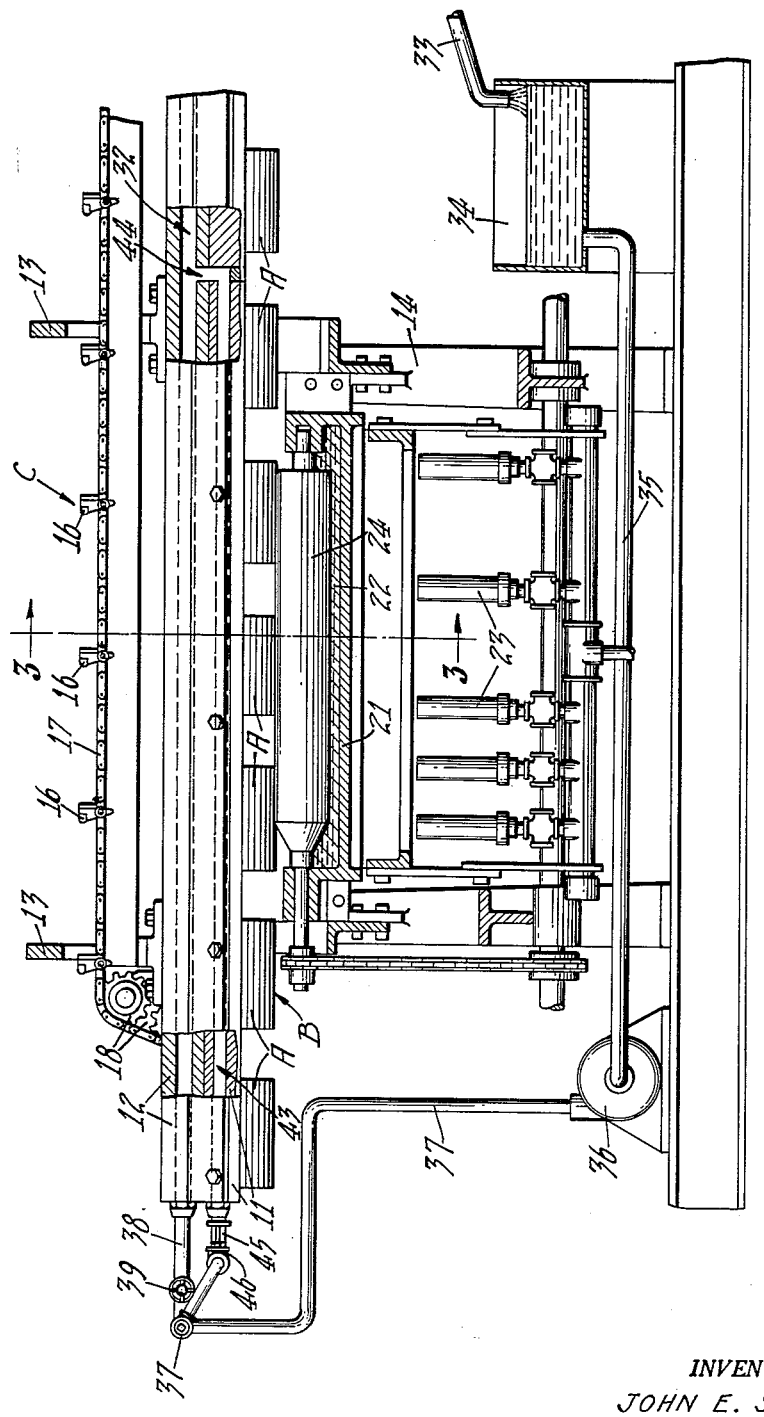

Jan. 17, 1956    J. E. SOCKE    2,730,982
SOLDERING MACHINE COOLING SYSTEM
Filed April 30, 1953    4 Sheets-Sheet 1

INVENTOR.
JOHN E. SOCKE
BY Charles H. Erne
Leland R. McCann
George W. Reiber
ATTORNEYS Jan. 17, 1956  J. E. SOCKE  2,730,982
SOLDERING MACHINE COOLING SYSTEM
Filed April 30, 1953  4 Sheets-Sheet 2

INVENTOR.
JOHN E. SOCKE
BY Charles H. Erne
Leland R. McCann
George W. Reiber
ATTORNEYS Jan. 17, 1956  J. E. SOCKE  2,730,982
SOLDERING MACHINE COOLING SYSTEM
Filed April 30, 1953  4 Sheets-Sheet 3

INVENTOR.
JOHN E. SOCKE
BY Charles H. Erne
Leland R. McCann
George W. Rauber
ATTORNEYS

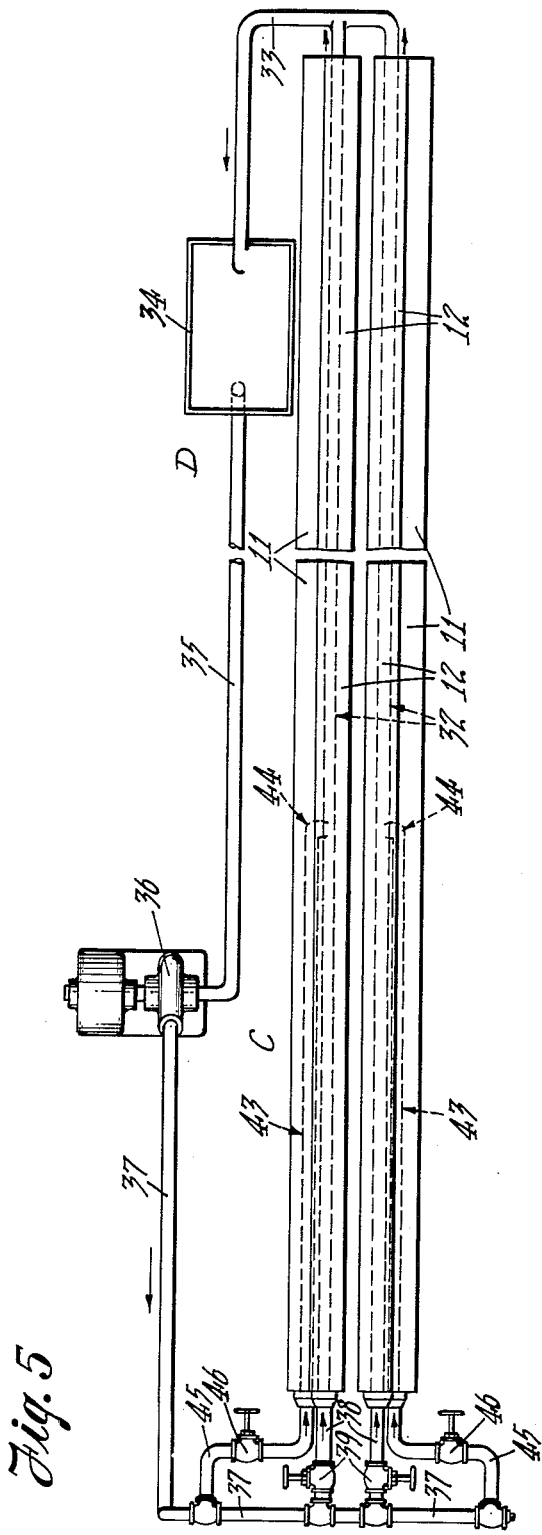

United States Patent Office 2,730,982
Patented Jan. 17, 1956

2,730,982

SOLDERING MACHINE COOLING SYSTEM

John E. Socke, Pelham Manor, N. Y., assignor to American Can Company, New York, N. Y., a corporation of New Jersey Application April 30, 1953, Serial No. 352,170

5 Claims. (Cl. 113—98)

The present invention relates to soldering machines used in conjunction with can body making machines and has particular reference to a self contained cooling system for reducing the temperature imparted to the parts of the machine adjacent the solder bath from which solder is applied to the side seams of can bodies. This is an improvement on the Soldering Machine disclosed in United States Patent 1,939,723, issued December 19, 1933, to John F. Peters.

An object of the invention is the provision in a can body side seam soldering machine of a cooling system wherein the cooling medium used to cool a heated portion of the machine is subsequently circulated through the can body cooling portion of the machine so that the cooling medium is reduced in temperature along with the can bodies and thus may be recirculated through the machine for a repeat cooling operation.

Another object is the provision of such a cooling system wherein the same cooling medium may be used repeatedly and thereby greatly reduce high cost and needless waste of the cooling medium.

Numerous other objects and advantages of the invention will be apparent as it is better understood from the following description, which, taken in connection with the accompanying drawings, discloses a preferred embodiment thereof.

Figure 2:
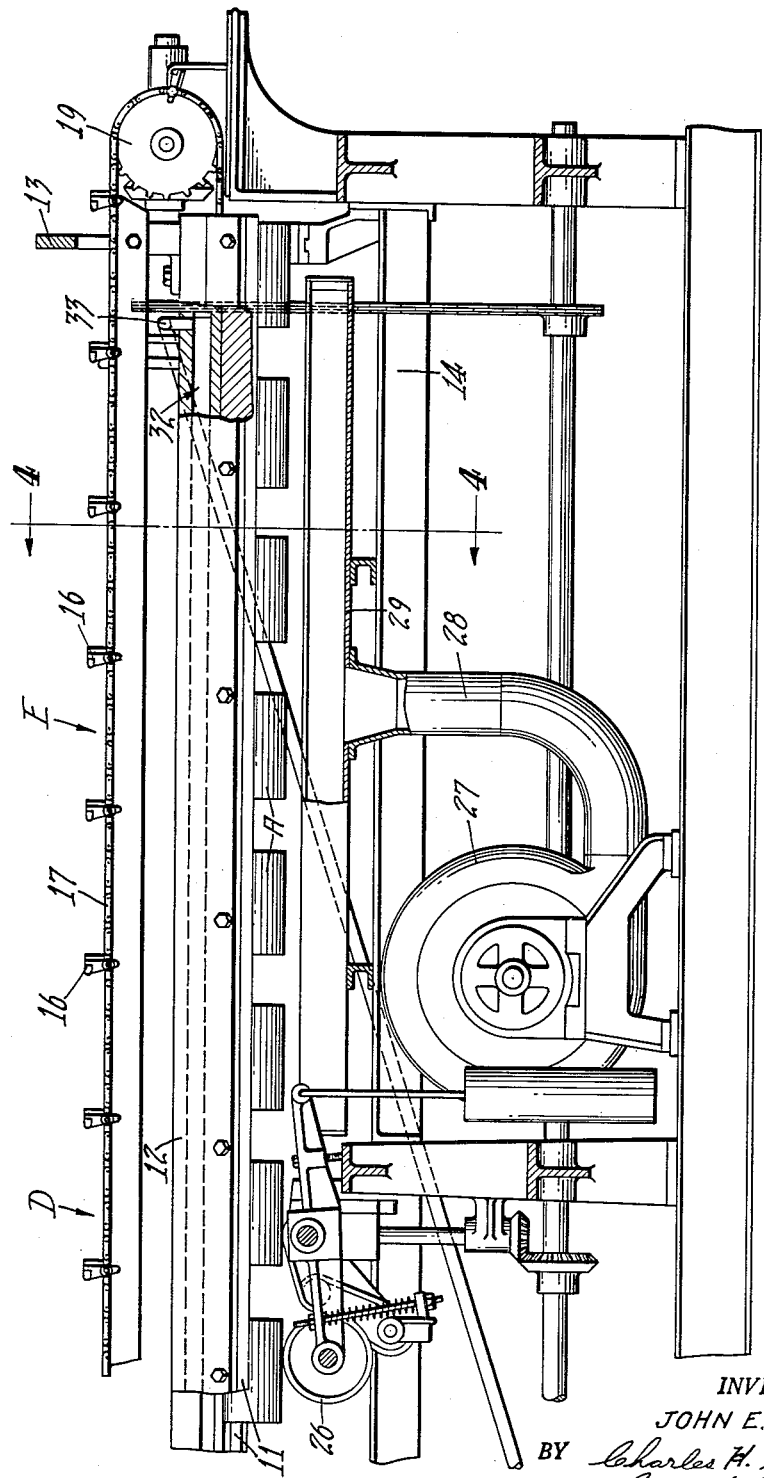
Figure 3:
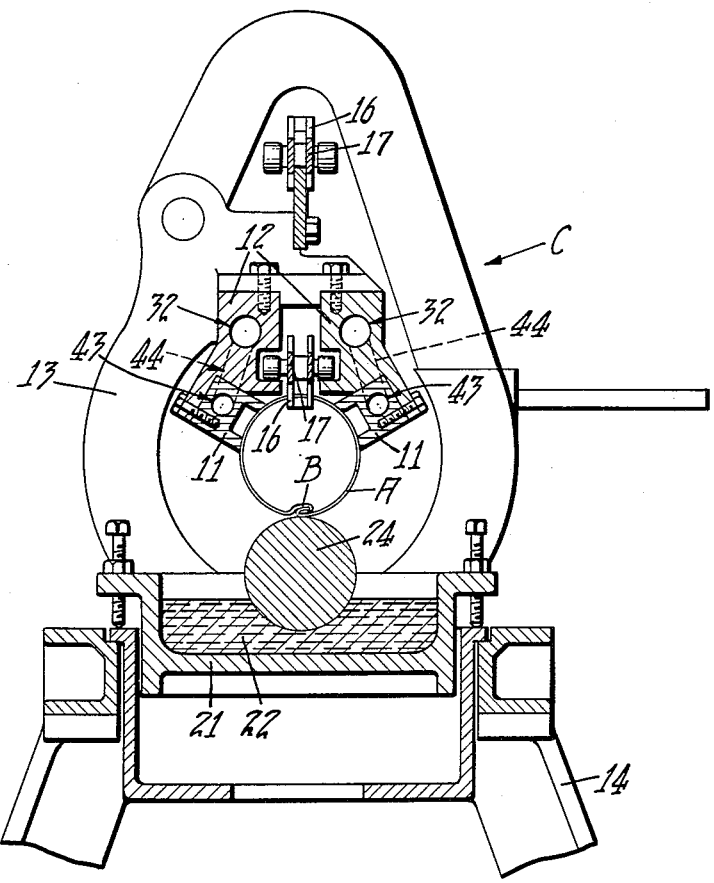
Figure 4:
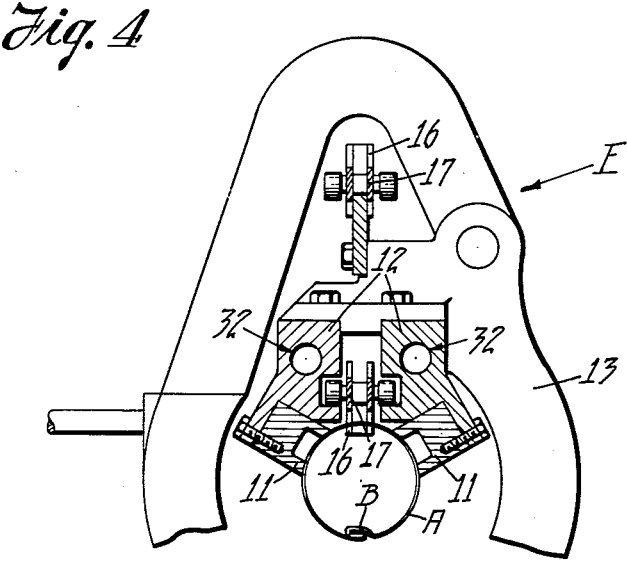

Referring to the drawings:

Figures 1 and 2 taken together are a side elevation of a soldering machine embodying the instant invention, parts being broken away and parts shown in section;

Figs. 3 and 4 are enlarged transverse sectional views taken substantially along the lines 3—3, 4—4 in Figs. 1 and 2 respectively, parts being broken away; and Fig. 5 is a schematic plan view of the cooling system used in the machine.

As a preferred or exemplary embodiment of the instant invention the drawings disclose principal parts of a side seam soldering machine of the character disclosed in United States Patent 1,639,955 issued August 23, 1927, to John H. Murch on Soldering Machine. In such a machine sheet metal can bodies A (Figs. 1 and 3) having unsoldered side seams B are advanced in processional order in end-to-end relation along a straight line path of travel with their side seams disposed at the bottom of the bodies and in longitudinal alignment.

The can bodies A usually are received from a can body making machine and are passed directly to the soldering machine for the soldering of their side seams. Accordingly, the can bodies A as they enter the soldering machine are first advanced through a soldering section C (Figs. 1 and 3) where the side seams are soldered. This soldering operation imparts considerable heat to the can bodies and to the adjacent parts of the machine since the solder bath temperature is usually maintained at about 720 degrees F. Following this soldering operation the bodies are advanced through a seam wiping section D (Fig. 2) to remove excess solder from the seams. After wiping, the bodies advance through a body cooling section E where cool air is blown onto the bodies to reduce their temperature so they can be handled upon discharge from the machine at the terminal end of the cooling section.

During their advancement through the machine the can bodies A are supported in a suspended manner by a pair of spaced and parallel elongated magnets 11 (Figs. 1, 2, 3 and 4) which extend the full length of the machine, passing through all of the working sections C, D and E. These magnets 11 are secured to a pair of spaced and parallel, longitudinal, horizontally disposed horn members 12 which like the magnets 11 extend the entire length of the machine. The horn members 12 are secured to a plurality of spaced brackets 13 which extend up from a frame 14 which constitutes the main frame of the machine.

The bodies A are propelled along the magnets 11 by gripper dogs 16 carried on a continuously moving conveyor chain 17 disposed above and along the horn member 12. The lower run of the conveyor chain 17 passes through the horn members between the magnets 11. At the entrance end of the machine (at the left as viewed in Fig. 1) the chain 17 operates over a pair of idler sprockets 18. At the discharge end of the machine the chain 17 operates over a driving sprocket 19 (Fig. 2) which is rotated in any suitable manner such as disclosed in the above mentioned Murch Patent 1,639,955.

In the soldering section C of the machine, the can bodies A pass over a solder tank 21 (Figs. 1 and 3) containing a bath of molten solder 22 maintained in a molten condition by a plurality of gas burners 23 disposed below the tank. As the bodies A pass over this solder tank 21, the solder 22 is carried up onto the side seams B of the bodies by a solder roll 24 which is engaged by the seams B as shown in Fig. 3 and which is rotated in the tank. Rotation of the solder roll 24 may be effected in any suitable manner such as shown in the Murch patent.

At the wiper section D, the soldered side seams B of the advancing can bodies engage against a rotating wiper wheel 26 (Fig. 2) of the type shown in the Murch patent. This wiper wheel removes the excess solder from the side seams.

The can body cooling section E is the longest section of the machine and as the bodies A advance along the magnets 11 through this section, cool air from a blower 27 is forced through a connecting conduit 28 to a cooling manifold 29. The manifold 29 extends the full length of the cooling section from the wiper section D to the discharge end of the machine (at the right as viewed in Fig. 2). The top of the manifold is open and extends along the path of travel of the can bodies A directly under their side seams. This cooling section E is purposely made long so as to give the bodies sufficient time in this section to lose most of the heat absorbed at the soldering section. This is a conventional side seam soldering machine.

In order to maintain the portions of the magnets 11 and the horn member 12 which extend through the exceedingly hot soldering section C of the machine at a reduced temperature to protect these parts against distortion, the instant invention provides for cooling them with a cooling medium which is maintained at a cooling temperature by the cooling effect of the air blast in the body cooling section E of the machine. For this purpose the horn members 12 are each provided with a longitudinal passageway 32 (Figs. 1, 2, 3, 4 and 5) which extends through the horn members for their full length. A liquid cooling medium such as water or brine is circulated through these passageways and the remainder of the system as will now be described.

The discharge ends of the passageways 32 (at the right as viewed in Figs. 2 and 5) are connected by a pipe 33 to an open expansion tank 34 (see also Fig. 1). The tank in turn is connected by a pipe 35 to a continuously operating pump 36 which forces the liquid cooling medium through a connecting pipe 37 which connects with a pair of short feed pipes 38 communicating with the entrance end of the passageways 32 (at the left in Figs. 1 and 5). A valve 39 is connected into each of the short feed pipes 38 to control the flow of the liquid cooling medium through the passageways 32.

In a similar manner, the magnets 11 are protected by the liquid cooling medium. For this purpose each of the magnets 11 is provided with a longitudinal passageway or conduit 43 (Figs. 1, 3 and 5). However, these conduits 43 extend only through the portion of the magnets which are located at the soldering section C of the machine, the conduits beginning at the entrance end of the magnets (at the left in Figs. 1 and 5) and stopping just beyond the solder tank 21 (at the right in Fig. 1). At this stopping point, each of the conduits 43 communicates with a port 44 which communicates with the passageways 32 in the horn members 12, the ports 44 being formed in the magnets and in the horn members. The entrance ends of the conduits 43 are connected by feed pipes 45 into the main supply pipe 37 as best shown in Fig. 5. These feed pipes 45 are provided with valves 46 for controlling the flow of the liquid cooling medium through the conduits 43 and ports 44.

Hence as the pump 36 supplies the liquid cooling medium to the supply pipe 37, it flows into and through the passageways 32 of the horn members 12 and the conduits 43 and ports 44 of the magnets 11 at the soldering section C and thus absorbs heat from these parts to reduce their temperature and thus protect them against the intense heat of the solder bath. After leaving this soldering section C, the heated cooling medium from the magnets 11 flows through the ports 44 and mixes with the heated cooling medium in the passageways 32 in the horn members 12 and thence they together flow through the remaining portions of the passageways 32 of the horn members 12 which extend through the can body cooling section E of the machine.

During passage of the heated cooling medium through this section E of the machine, the cool air which is blown against the soldered can bodies A also blows against the horn members 12 and thus dissipates the heat in the cooling medium passing through the passageways 32 in the horn members. By the time the heated cooling medium has passed through the cooling section E, from the soldering section C to the discharge end of the machine, it is reduced in temperature sufficiently to be recirculated through the machine for a repeat cooling operation. Hence the recooled cooling medium flows through the discharge pipe 33 into the expansion tank 34 and passes on through the pipe 35 to the pump 36 which effects the recirculation of the medium.

Thus the same liquid cooling medium may be used repeatedly, indefinitely without loss and at a low cost.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can body side seam soldering machine, the combination of a can body side seam soldering section and a can body cooling section, said soldering section including machine parts for engaging can bodies and means for applying molten solder to the side seams of the can bodies, a cooling system including means for circulating a liquid cooling medium through said soldering section to cool said machine parts and continuing through said body cooling section, and means in said cooling section for cooling said can bodies and said liquid cooling medium, whereby said liquid cooling medium absorbs heat from said machine parts in said soldering section to protect said machine parts and gives up said heat in said body cooling section to reduce the temperature of said liquid cooling medium for recirculation through the machine for a repeat cooling operation in said soldering section.

2. In a can body side seam soldering machine, the combination of a longitudinal support for a plurality of can bodies arranged in processional order and having side seams to be soldered, means for propelling said can bodies along said support, soldering means including a solder bath disposed adjacent a portion of said support for applying molten solder to the side seams of said can bodies on said support, can body cooling means disposed adjacent another portion of said support for cooling the soldered can bodies and said portion of the support adjacent said body cooling means, and a cooling system extending through said support past said solder bath and said body cooling means and including means for circulating a liquid cooling medium through said system whereby said liquid cooling medium absorbs heat from the portion of said support adjacent said solder bath to protect said support and gives up said heat as it circulates through the portion of said support adjacent said body cooling means to reduce the temperature of said liquid cooling medium for recirculation through said support for a repeat cooling operation.

3. In a can body side seam soldering machine, the combination of a longitudinal support for a plurality of can bodies arranged in processional order and having side seams to be soldered, means for propelling said can bodies along said support, soldering means including a solder bath disposed adjacent a portion of said support for applying molten solder to the side seams of said can bodies on said support, can body cooling means disposed adjacent another portion of said support for cooling the soldered can bodies and said portion of the support adjacent said body cooling means, and a cooling system extending through said support past said solder bath and said body cooling means and including means having a circulating pump and an expansion tank communicating with each other and with said support for circulating a liquid cooling medium through said system whereby said liquid cooling medium absorbs heat from the portion of said support adjacent said solder bath to protect said support and gives up said heat as it circulates through the portion of said support adjacent said body cooling means to reduce the temperature of said liquid cooling medium for recirculation through said support for a repeat cooling operation.

4. In a can body side seam soldering machine, the combination of a longitudinal horn member extending through said machine, a magnet secured to and extending along said horn member for supporting a procession of can bodies having side seams to be soldered, means for propelling said can bodies along said magnet, soldering means including a solder bath disposed adjacent portions of said horn member and said magnet for applying molten solder to the side seams of said can bodies moving along said magnet, can body cooling means disposed adjacent other portions of said horn member and said magnet for cooling the soldered can bodies on said magnet and said portions of the horn member adjacent said body cooling means, and a cooling system extending through said horn member past said solder bath and said can body cooling means and also extending through said magnet past said solder bath only and beyond said solder bath communicating with said horn member for circulating a liquid cooling medium therethrough whereby said liquid cooling medium absorbs heat from the portions of said horn member and said magnet disposed adjacent said solder bath to protect these portions of said horn member and said magnet and gives up said heat as it circulates through the portion of said horn member adjacent said body cooling means to reduce the temperature of said liquid cooling medium for recirculation through said horn member and said magnet for a repeat cooling operation.

5. In a can body side seam soldering machine, the combination of a longitudinal support for a plurality of can bodies arranged in processional order and having side seams to be soldered, means for propelling said can bodies along said support, soldering means including a solder bath disposed adjacent a portion of said support for applying molten solder to the side seams of said can bodies on said support, can body cooling means disposed adjacent another portion of said support for cooling the soldered can bodies and said portion of the support, adjacent said body cooling means and a cooling system extending through said support past said solder bath and said body cooling means and including means for circulating a liquid cooling medium through said system whereby said liquid cooling medium absorbs heat from the portion of said support adjacent said solder bath to protect said support and gives up said heat as it circulates through the portion of said support adjacent said body cooling means to reduce the temperature of said liquid cooling medium for recirculation through said support for a repeat cooling operation, and valve means connected into said system for controlling the flow of said liquid cooling medium through said system.

References Cited in the file of this patent

UNITED STATES PATENTS

| | | |
|---|---|---|
| 1,534,677 | Assmann | Apr. 21, 1925 |
| 1,939,723 | Peters | Dec. 19, 1933 |